US011009398B2

(12) United States Patent
Lantsov et al.

(10) Patent No.: US 11,009,398 B2
(45) Date of Patent: May 18, 2021

(54) TUNABLE OPTICAL FILTER BASED UPON LIQUID CRYSTAL CELL AND WAVELENGTH SWEEPING METHOD

(71) Applicant: SAMSUNG ELECTRONICS CO., LTD., Suwon-si (KR)

(72) Inventors: Aleksey Dmitrievitch Lantsov, Lobnya (RU); Alexander Viktorovitch Morozov, Podolsk (RU); Aleksey Grigorievitch Anikanov, Troitsk (RU); Maksim Vladimirovitch Ryabko, Dolgoprudny (RU); Anton Sergeevitch Medvedev, Krasnozavodsk (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 63 days.

(21) Appl. No.: 16/426,085

(22) Filed: May 30, 2019

(65) Prior Publication Data

US 2019/0368932 A1 Dec. 5, 2019

(30) Foreign Application Priority Data

May 30, 2018 (RU) ................................ 2018119922
Apr. 29, 2019 (KR) ......................... 10-2019-0049569

(51) Int. Cl.
*G01J 3/28* (2006.01)
*G02F 1/1347* (2006.01)
*G01J 3/447* (2006.01)
*G01J 3/12* (2006.01)
*G01J 3/10* (2006.01)

(52) U.S. Cl.
CPC ............. *G01J 3/2823* (2013.01); *G01J 3/447* (2013.01); *G02F 1/13473* (2013.01); *G01J 3/10* (2013.01);

(Continued)

(58) Field of Classification Search
CPC .. G01J 3/2823; G01J 3/447; G01J 2003/1247; G01J 3/10; G01J 2003/1269;
(Continued)

(56) References Cited

U.S. PATENT DOCUMENTS 4,272,195 A * 6/1981 Kaye ..................... G02F 1/1313
349/125
4,278,327 A * 7/1981 McMahon ............. G02F 1/1326
349/197

(Continued)

FOREIGN PATENT DOCUMENTS

JP 2006-313239 A 11/2006

*Primary Examiner* — Jessica M Merlin
(74) *Attorney, Agent, or Firm* — Sughrue Mion, PLLC (57) ABSTRACT

A tunable optical filter, includes a light source configured to emit optical radiation to a sample; an input optical element configured to receive optical radiation reflected from the sample; a liquid crystal cell comprising electrodes, the liquid crystal cell contacting the input optical element; an output optical element, contacting the liquid crystal cell; and a control unit adapted to apply a preset voltage to the liquid crystal cell via the electrodes; wherein the input optical element and the output optical element have a same first refractive index, wherein, when voltage is not applied to the liquid crystal cell, the first refractive index is greater than a second refractive index of the liquid crystal cell for a wavelength range of incident optical radiation, and wherein the input optical element, the liquid crystal cell and the output optical element are tilted at an angle to the incident optical radiation.

12 Claims, 5 Drawing Sheets

(52) U.S. Cl.
CPC ............. *G01J 2003/1247* (2013.01); *G01J 2003/1269* (2013.01); *G02F 2201/56* (2013.01); *G02F 2203/023* (2013.01); *G02F 2203/055* (2013.01)

(58) Field of Classification Search
CPC .......... G01J 3/28; G01J 3/0256; G01J 3/0224; G02F 1/13473; G02F 2203/023; G02F 2201/56; G02F 2203/055
See application file for complete search history.

(56) References Cited

U.S. PATENT DOCUMENTS

| | | | |
|---|---|---|---|
| 4,444,469 A * | 4/1984 | Kaye | G02F 1/1393 349/18 |
| 5,986,728 A | 11/1999 | Bernard | |
| 6,271,968 B1 | 8/2001 | Dobrowolski et al. | |
| 6,310,673 B1 | 10/2001 | Sharp | |
| 6,618,027 B2 * | 9/2003 | Takatori | G02F 1/195 345/32 |
| 6,999,649 B1 * | 2/2006 | Chen | G02F 1/07 349/177 |
| 7,009,680 B2 * | 3/2006 | Cavanaugh | G02F 1/216 349/18 |
| 7,012,695 B2 | 3/2006 | Maier et al. | |
| 9,366,565 B2 | 6/2016 | Uvnäs | |
| 2003/0039019 A1 | 2/2003 | Large et al. | |
| 2013/0188254 A1 | 7/2013 | Li et al. | |
| 2014/0125928 A1 | 5/2014 | Chen | |
| 2017/0043431 A1 | 2/2017 | Kuba et al. | |

\* cited by examiner

TUNABLE OPTICAL FILTER BASED UPON LIQUID CRYSTAL CELL AND WAVELENGTH SWEEPING METHOD

CROSS-REFERENCE TO RELATED APPLICATIONS

This application claims the benefit under 35 U.S.C. § 119(a) of Russian Patent Application No. 2018119922, filed on May 30, 2018 in the Russian Intellectual Property Office, and of Korean Patent Application No. 10-2019-0049569, filed on Apr. 29, 2019 in the Korean Intellectual Property Office, the entire disclosures of which are incorporated herein by reference.

BACKGROUND

Field

The disclosure relates to devices and methods for performing and controlling optical wavelength filtering.

Description of Related Art

Devices and methods related to near-infrared (IR) and visible spectrum spectroscopy are of high importance nowadays in such fields as biology and medicine. The global trend aimed at providing users with portable wearable healthcare devices also drives the development of wearable spectroscopic devices. A core element of this technique is an optical filter which should be compact and tunable in a maximally broad range with high precision. Precise wavelength sweeping is required for different spectroscopic applications, included among which is non-invasive blood glucose measurement. There exist different methods of wavelength sweeping—including MEMS-based (microelectromechanical systems with mechanical control of optical path length), Mach-Zender type filter, or tunable filters, which are based upon acousto-optics. Another promising class of solutions is based upon liquid crystal devices which possess several advantages including absence of mechanical moving parts and lower energy consumption.

However, currently proposed wavelength sweeping devices and methods either have a high complexity restricting their use in a portable compact form, or utilize high voltages needed for controlling liquid crystal thickness in order to increase performance.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to an aspect of the disclosure, a tunable optical filter includes a light source configured to emit optical radiation to a sample; an input optical element configured to receive optical radiation reflected from the sample; a liquid crystal cell comprising electrodes, the liquid crystal cell contacting the input optical element; an output optical element, contacting the liquid crystal cell; and a control unit adapted to apply a preset voltage to the liquid crystal cell via the electrodes; wherein the input optical element and the output optical element have a same first refractive index, wherein, when voltage is not applied to the liquid crystal cell, the first refractive index is greater than a second refractive index of the liquid crystal cell for a wavelength range of incident optical radiation, and wherein the input optical element, the liquid crystal cell and the output optical element are tilted at an angle to the incident optical radiation.

The light source may be configured to emit collimated optical radiation.

The tunable optical filter may further include a collimating lens configured to collimate the optical radiation reflected from the sample.

The tunable optical filter may further include a polarizer configured to polarize the optical radiation reflected from the sample.

The polarizer may be at least one from among a polarizing plate, a wire grid polarizer and a thin film polarizer.

Each of the input optical element and the output optical element may include a photopolymer or glass.

Each of the input optical element and the output optical element may include at least one from among an optical fiber, a holographic optical element and a prism.

In response to no voltage being applied to the liquid crystal cell, all optical radiation incident upon a boundary between the input optical element and the liquid crystal cell may be reflected, and wherein, in response to the preset voltage being applied to the liquid crystal cell, a working portion of the optical radiation incident upon the boundary between the input optical element and the liquid crystal cell may be transmitted and a remaining portion of the optical radiation incident upon the boundary between the input optical element and the liquid crystal cell may be reflected.

The control unit may be configured to adjust the preset voltage value to adjust a wavelength range of optical radiation transmitted by the liquid crystal cell.

The input optical element may be positioned between the liquid crystal cell and the sample.

The liquid crystal cell may be positioned between the sample and the output optical element.

The tunable optical filter may further include a photodetector configured to detect optical radiation exiting the output optical element.

According to an aspect of the disclosure, a method for wavelength sweeping includes emitting optical radiation; polarizing the optical radiation; passing the polarized optical radiation through an input optical element, a liquid crystal cell contacting the optical element, and an output optical element contacting the liquid crystal cell; and applying a preset voltage value to the liquid crystal cell, wherein the input optical element, the liquid crystal cell and the output optical element are tilted at an angle to the polarized optical radiation.

The input optical element and the output optical element may have a same first refractive index, and when voltage is not applied to the liquid crystal cell, the first refractive index may be greater than a second refractive index of the liquid crystal cell for a wavelength range of the polarized optical radiation.

In response to no voltage being applied to the liquid crystal cell, all optical radiation incident upon a boundary between the input optical element and the liquid crystal cell may be reflected, and in response to the preset voltage being applied to the liquid crystal cell, a working portion of the optical radiation incident upon a boundary between the input optical element and the liquid crystal cell may be transmitted and a remaining portion of the optical radiation incident upon a boundary between the input optical element and the liquid crystal cell may be reflected.

The control unit may be configured to adjust the preset voltage value to adjust a wavelength range of optical radiation transmitted by the liquid crystal cell.

The optical radiation may be polarized through at least one from among a polarizing plate, a wire grid polarizer and a thin film polarizer.

Each of the input optical element and the output optical element may include at least one from among an optical fiber, a holographic optical element and a prism.

BRIEF DESCRIPTION OF DRAWINGS

The foregoing and other features and advantages of the disclosure are described in the following with reference to the drawings, in which.

DETAILED DESCRIPTION

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of example embodiments. However, it is apparent that example embodiments can be practiced without those specifically defined matters. Also, well-known functions or constructions are not described in detail since they would obscure the description with unnecessary detail.

The meanings of terms described below may vary depending on, for example, a user or operator's intentions or customs. Therefore, in the following embodiments, when terms are specifically defined, the meanings of terms should be interpreted based on definitions, and otherwise, should be interpreted based on general meanings recognized by those skilled in the art.

As used herein, the singular forms are intended to include the plural forms as well, unless the context clearly indicates otherwise. It will be further understood that the terms "comprises" and/or "comprising," or "includes" and/or "including" when used in this description, specify the presence of stated features, numbers, steps, operations, elements, components or combinations thereof, but do not preclude the presence or addition of one or more other features, numbers, steps, operations, elements, components or combinations thereof.

It will also be understood that the elements or components in the following description are discriminated in accordance with their respective main functions. In other words, two or more elements may be made into one element or one element may be divided into two or more elements in accordance with a subdivided function. Additionally, each of the elements in the following description may perform a part or whole of the function of another element as well as its main function, and some of the main functions of each of the elements may be performed exclusively by other elements. Each element may be realized in the form of a hardware component, a software component, and/or a combination thereof.

According to an example embodiment, use of a single liquid crystal cell to perform sequential selection of a required wavelength enables simplification of design;

According to an example embodiment, use of a liquid crystal cell that is tilted at an angle to the incident radiation beam reduces power consumption by eliminating the need for high voltages for operating thick layers of liquid crystals which are aligned orthogonally to the incident radiation beam.

Example embodiments make it possible to perform wavelength sweeping in a predetermined manner by using a single liquid crystal cell, which reduces the size of the device as well as the energy consumed by the device. Example embodiments may be configured for use with both IR and visible spectrum radiation.

The proposed device comprises optical elements and a liquid crystal cell, positioned at such an angle to the incident beam that the effect of the total internal reflection of the incident beam occurs in the input optical element at the boundary between the input optical element and the liquid crystal cell. When no voltage is applied to the liquid crystal cell, the incident radiation does not pass through the liquid crystal cell. The voltage applied to the liquid crystal cell changes a gradient of the refractive index of the liquid crystal cell and thus disrupts the total internal reflection (TIR) effect for some wavelengths or a wavelength range from the full spectrum of the incident radiation that enters the liquid crystal cell. A change in the gradient of the refractive index is considered, since a change in the condition of the light beam propagation in the LC cell contributes to the effect of wavelength sweeping. Each point inside the liquid crystal cell has its own refractive index.

Figure 1:
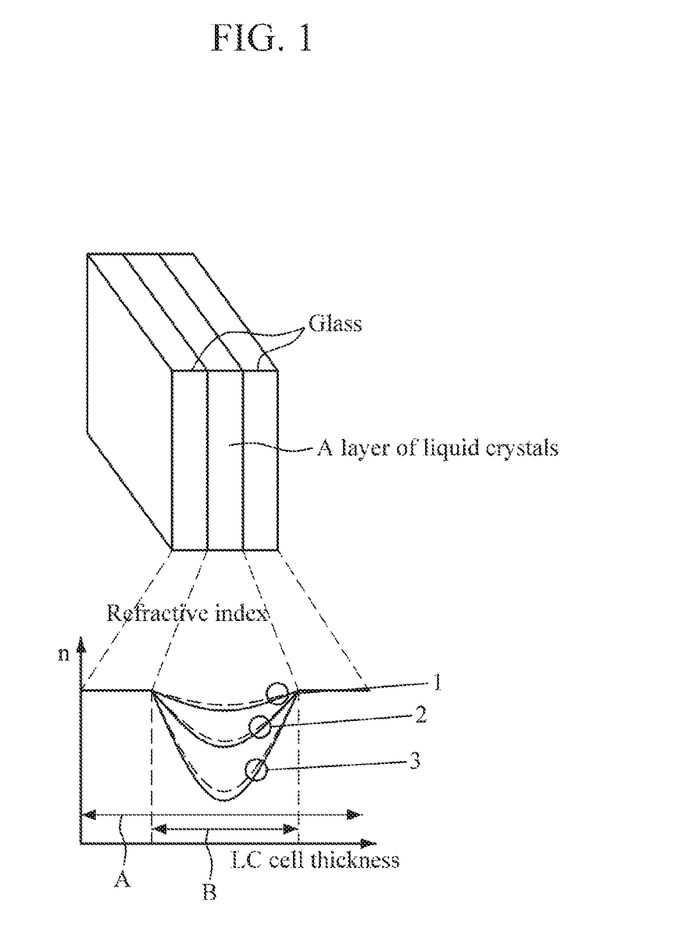
FIG. 1 shows a distribution of the refractive index through the liquid crystal cell thickness for various voltage values for two arbitrary wavelengths according to an embodiment.

FIG. 1 shows distribution of the refractive index through the thickness of a liquid crystal cell for various voltage values applied to the cell for two arbitrary wavelengths. Curves 1, 2, and 3 each represent a different applied voltage for the refractive indices of the two arbitrary wavelengths, which are shown by a solid and dashed line. As shown in FIG. 1, a liquid crystal cell includes a layer of liquid crystals between glass layers. A is the overall thickness of the liquid crystal cell, and B is the thickness of a layer of liquid crystals. The molecules of a liquid crystal are oriented in different ways, although there is a predominant direction in their orientation. The number of molecules acquiring a definite orientation tends to a maximum with an increase in the voltage applied to the cell. It should be noted that even without a voltage applied, a liquid crystal cell has a refractive index gradient. If the voltage is not applied to the liquid crystal cell, then the total internal reflection condition takes place for some wavelengths. This condition is determined by dispersion of the liquid crystal layer and the wavelengths of the incident radiation.

The liquid crystal cell is combined with two optical elements meant to provide a proper angle of incidence upon the liquid crystal cell and parallel alignment between the incident and passing beams.

The use of optical elements is critical, as it is known that the total internal reflection is impossible when changing from a less dense optical medium (from air) to a denser optical medium (liquid crystal cell). Given that the refractive index of the liquid crystal cell is n2>1 ("1" is the refractive index of air) for certain wavelengths, in order to achieve the effect of the total internal reflection in the absence of the voltage applied to the liquid crystal cell, it is necessary to use the material of the input optical element with a refractive index (n1), on the assumption that n1>n2. The values of n1 and n2, and therefore the optical elements and the liquid crystal cell are selected for each desired wavelength to perform sweeping therein. As is known, the sine of the angle of total internal reflection is defined as $$\sin \alpha_{np} = n_{21} = \frac{n_2}{n_1}$$

That is, for example, in the case where n1=1.723 and n2=1.5, where in this example n1 is the refractive index of the "heavy flint" glass, n2 is the refractive index of an ordinary glass, since the layer of liquid crystals at the boundaries between the optical element and the liquid crystal element has approximately the same refractive index as that of the ordinary glass, the maximum angle of the total internal reflection is approximately 60°. In this case, the optical scheme looks similar to that shown in FIG. 2. When voltage at the liquid crystal cell changes, the refractive index of the liquid crystal cell changes, and the conditions for occurrence of the effect of the total internal reflection are eliminated for certain wavelengths from the radiation spectrum falling upon the liquid crystal cell. In this case, some incident radiation of one or more specific wavelengths passes through the liquid crystal cell.

To output this radiation from the liquid crystal cell and make parallel the input and output beams (for convenient adjustment and reduction of the device dimensions), the output optical medium (output optical element) with a refractive index n1 is positioned after the liquid crystal cell. In this case, the radiation beam emerging from the output optical element is parallel to the beam incident on the input optical element positioned before the liquid crystal cell.

Optical elements with a refractive index n1 may be different and may include glass and/or other materials with a suitable refractive index. Likewise, the geometry of optical elements is not essential. Critically important for wavelength sweeping is the incidence of the input radiation at an angle so as to provide the effect of the total internal reflection at the initial moment when de-energized. Accordingly, the shape of optical elements may vary so long as this condition is fulfilled. Thus, the cell can be located parallel to the incident beam if, due to the shape of the elements, the beam will be incident upon the input optical element at the specified angle.

Thus, the proposed optical device for wavelength sweeping consists of the following elements: a light source that emits optical radiation to a sample, the light from the light source incident on the sample and reflected from the sample; a collimator which collimates optical radiation reflected from the sample; polarizer, which polarizes optical radiation reflected from the sample; at least one input optical element positioned after the polarizer; twisted nematic liquid crystal cell covered with two layers of indium tin oxide (ITO) with electrodes attached to to the liquid crystal cell, the cell positioned after the input optical element with respect to the optical path and closely attached to it (i.e., directly contacting the input optical element), the input optical element having such a refractive index and the liquid crystal cell having such a refractive index for the desired wavelength and are tilted at such a critical angle to the polarized optical radiation that the effect of the total internal reflection of the polarized optical radiation for this wavelength at the boundaries between the input optical element and the liquid crystal cell is provided; an output optical element positioned after the liquid crystal cell with respect to the optical path and closely attached to it (i.e., directly contacting the liquid crystal cell) and having a refractive index that coincides with that of the input optical element in order to keep the initial direction of optical radiation; and a control unit that generates a control signal applied to the liquid crystal cell through the electrodes.

According to one embodiment, a light source may emit coherent collimated optical radiation or incoherent collimated optical radiation to a sample. The light source may include one or more light sources formed with a light emitting diode (LED), organic light emitting diode (OLED), Quantum dot light-emitting diodes (QLED) a laser diode, or a fluorescent body. However, the light source is not limited to the above examples.

According to an embodiment, a polarizer may include, but is not limited to, a polarizing plate, a wire grid polarizer, a thin film polarizer, and the like.

According to an embodiment, an input optical element and an output optical element may be made of a photopolymer or glass, and may include, but are not limited to, an optical fiber, a holographic optical element, a prism, and the like.

A method for wavelength sweeping is also provided, comprising the steps of: emitting optical radiation from the radiation source; polarizing the optical radiation emitted from the radiation source; passing the polarized optical radiation through an input optical element and a liquid crystal cell attached closely to (i.e., directly contacting) the first optical element, the input optical element and the liquid crystal cell having such refractive indices for a desired wavelength that the polarized optical radiation in the desired wavelength is subject to the effect of the total internal reflection at the boundary between the input optical element and the liquid crystal cell when no voltage is applied to the liquid crystal cell; applying a voltage to the liquid crystal cell to provide a change in the refractive index of the liquid crystal cell for the wavelength incident upon the liquid crystal cell and the disruption of the effect of the total internal reflection of the polarized optical radiation at the boundary between the input optical element and the liquid crystal cell only for an operating range (i.e., working part or working portion) of the optical radiation; and passing the optical radiation with swept spectrum through at the output optical element, positioned after the liquid crystal cell with respect to the optical path. The relation between the working part of the wavelength range and the preset voltage value may be predetermined.

Figure 2:
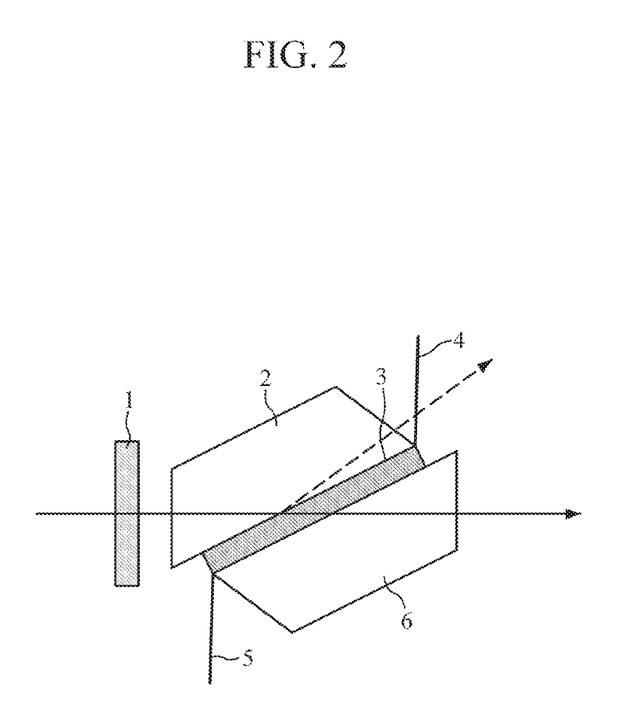
FIG. 2 shows a general scheme of a tunable optical filter based upon a liquid crystal cell according to an embodiment.

The general scheme of the optical filter based upon liquid crystal cell according to an embodiment is shown in the FIG. 2. The radiation beam, e.g., reflected from the sample (indicated by an arrow), passes through a polarizer 1 and falls upon an input optical element 2, which is closely attached to the surface of a nematic liquid crystal cell 3 that is controlled by a voltage applied via electrodes 4 and 5 that are connected to layers of Indium tin oxide (ITO), covering the liquid crystal cell. After passing through the liquid crystal cell 3 the radiation beam passes through an output optical element 6.

The dashed line in FIG. 2 shows a probable path of radiation in case of the total internal reflection within the input optical element 2 from the boundary between the input optical element 2 and the liquid crystal cell 3. In the case of total internal reflection, the radiation is completely reflected, enters the input optical element 2 and exits through one of the faces of the input optical element 2. When a voltage is applied to the liquid crystal cell 3, its refractive index gradient changes. This leads to changes in dispersion in the liquid crystal cell 3 and creates conditions for transmission of radiation only in the desired wavelength range. Each value of the applied voltage corresponds to its dispersion of the liquid crystal cell 3, that is, the spatial distribution of the refractive index in the thickness of the cell and the wavelength of transmitted radiation have a predetermined relationship. Thus, each of the values of the applied voltage determines its transmission spectrum of the liquid crystal cell 3. In this case, the conditions for the total internal reflection effect in the input optical element 2 are eliminated only for some wavelengths of the incident polarized optical radiation, that is, some radiation, for which the effect of the total internal reflection ceases to be performed, passes through the liquid crystal cell 3, enters the output optical element 6 along the path shown by a solid line in FIG. 2, and exits the output optical element 6 to reach the sensor.

Figure 3:
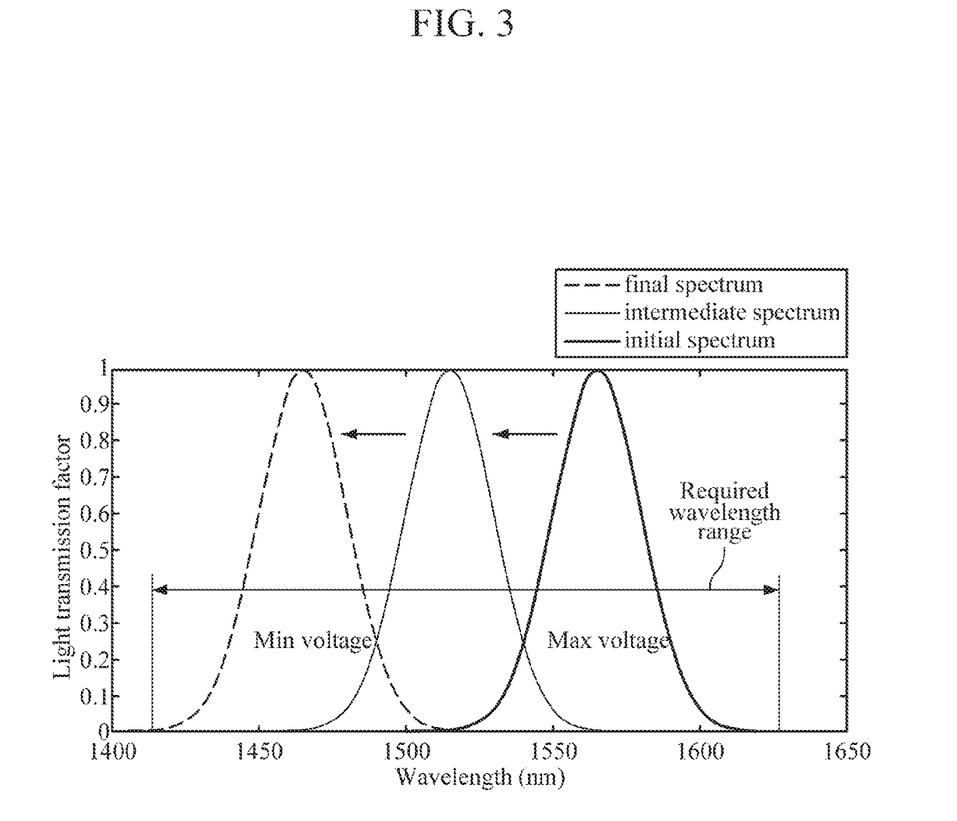
FIG. 3 shows theoretical dependencies of infra-red radiation transmission through the liquid crystal cell according to applied voltage.

The numerically calculated spectra of the transmitted radiation observed at different voltage values applied to the liquid crystal cell are shown in FIG. 3. The swept wavelength is shown, which is determined by the tasks of the user. For example, it may be necessary to obtain information about glucose in human blood using optical spectroscopy. Similar studies are conducted in the wavelength range 1400-1650 nm, since such radiation has the greatest penetration power in biological tissue. In this range, sweeping of the wavelengths transmitted by the liquid crystal cell is performed in order to detect signals corresponding to the reflection of radiation from the blood glucose molecules, which in turn are maximal at a wavelength of the order of 1500-1600 nm.

Based on the requirements for the specified wavelength, a filter is constructed, namely, the required thickness of the liquid crystal cell layer is selected, the material of the input and output optical elements is selected, and the operating values of voltages applied to the liquid crystal cell are determined. The thickness of the liquid crystal cell layer and the material of optical elements are selected empirically, after preliminary mathematical modeling. Knowing the value of the material dispersion, as well as the spectrum of the radiation source at the cell input and the expected thickness of the materials, it is possible to simulate the radiation spectrum at the output. The ability to change the refractive index gradient of any particular liquid crystal cell is limited by its parameters—the thickness and the type of crystals. Accordingly, a liquid crystal cell having parameters specific to a specific wavelength is produced, and then the transmission range of the produced liquid crystal cell is changed within these limits by applying the required voltage.

The user may investigate how the sample behaves in the required wavelength, that is, investigate the reflection spectrum of the sample in the wavelength range: what the light transmission factor of the sample is, what the degree of absorption is in the selected range, etc.

FIG. 3 shows three graphs, each corresponding to a specific applied voltage, of dependency of the normalized transmission factor of the liquid crystal cell radiation on a particular wavelength having a swept wavelength range in this case from 1400 nm to 1650 nm. When the voltage value is maximal, the dependence of the normalized transmission coefficient of the liquid crystal cell on the wavelength of the incident radiation is shown in FIG. 3 to the right and is designated as the "initial spectrum". It should be noted that with the normalized transmission factor divided by its maximum value, the graph is plotted for the normalized transmission factor for clarity.

After the voltage is decreased to some intermediate value, the refractive index of the cell changes for the wavelength range and, accordingly, the spectral composition of the radiation passing through the cell changes. The process of voltage decrease and the process of changing the refractive index occur practically at the same time. The delay between them is caused by the finite response time of the molecules of liquid crystals to the applied voltage and amounts to milliseconds. In this case, the graph of dependence of the normalized transmission factor of the liquid crystal cell on the wavelength of the incident radiation is shown in FIG. 3 in the center and is designated as the "intermediate spectrum". It can be seen from the graph that as the voltage decreases, the curve of the indicated dependence shifts to the left, which is shown by the wavelength, which now passes through the liquid crystal cell. The dependence behaves similarly when the voltage is further decreased to a certain minimum value—the wavelength passed through the liquid crystal cell shifts to the left. This curve is referred to as the "final spectrum". This example demonstrates sweeping of the liquid crystal cell wavelength as the voltage decreases, which corresponds to a shift in the wavelength passing through the liquid crystal cell from the right to the left, as indicated by the arrows in FIG. 3.

According to an embodiment, a tunable optical filter may be applied to reconstruct the radiation spectrum reflected by a sample (e.g., human skin tissue). When examining the reflection spectrum of a sample, it is required to measure an integral signal obtained after the source radiation is reflected from the sample and passed through the liquid crystal cell. The value of this signal is determined by the wavelength of radiation transmitted by the liquid crystal cell. The more different bandwidths of the liquid crystal cell are used (by applying voltage), the more signal values can be obtained from the sample. These values are subsequently used to reconstruct the reflection spectrum of the sample, and the more of these signal values there are, the more accurately one can reconstruct the spectrum.

Figure 4:
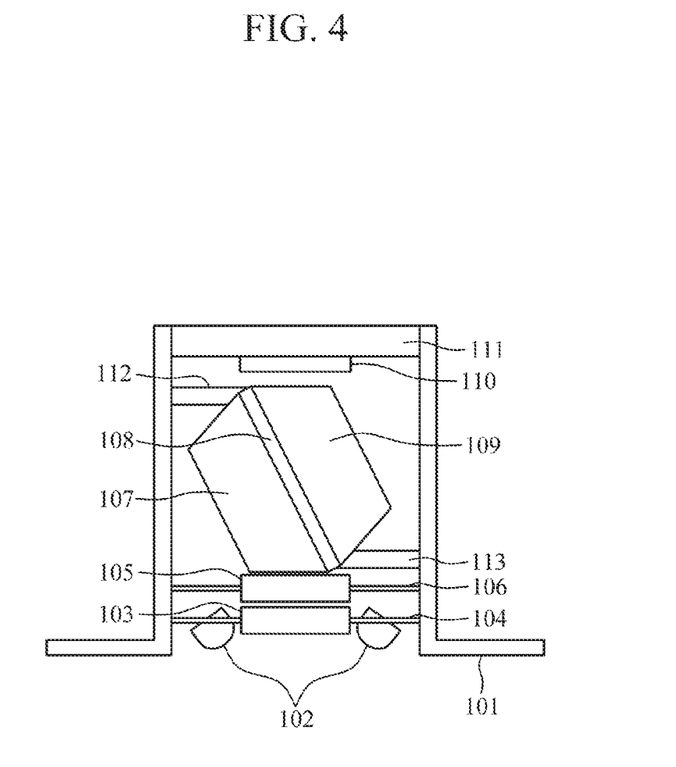
FIG. 4 shows an embodiment of the tunable optical filter in a spectrometer.

FIG. 4 shows embodiment of the tunable optical filter in a spectrometer. The body 101 of the spectrometer includes a set of light-emitting diodes 102 which emit radiation characterized by a certain constant spectrum. The radiation falls on the sample (not shown in FIG. 4). After reflection from the sample, the radiation passes through a collimating lens 103 attached to the spectrometer body by means of a fastener 104. The collimated radiation is passed through a polarizer 105 attached to the spectrometer body by means of a fastener 106. The polarizer is needed to supply light with a certain polarization state to the liquid crystal cell. For example, the polarization plane at the cell input may be perpendicular to the plane of the rectangular cell. The cell is most sensitive to this polarization state, that is, the above effect is achieved by using the light that is polarized in such a way. After the polarizer, the radiation passes successively through an input optical element 107, a liquid crystal cell 108, if voltage is applied to the latter, and an output liquid crystal element 109. The radiation from the output optical element passes to a photodetector 110 connected to a control unit 111. The control unit receives an electrical signal corresponding to the light energy detected by the photodetector 110, and also controls the voltage that is applied to the liquid crystal cell 108 by means of the electrodes 112 and 113 associated with the ITO layer. The electrodes also serve as supports for connecting the input and output prisms and the liquid crystal cell 108 to the spectrometer body. The control unit 111 may adjust the voltage applied to the liquid crystal cell to adjust a wavelength range of optical radiation transmitted by the liquid crystal cell 108.

The photodetector 110 detects the integral signal coming from the output optical element positioned after the liquid crystal cell with respect to the optical path. The photodetector collects all the light energy from the output optical element, that is, the integral signal that is used in reconstructing the spectrum reflected from the sample. According to one embodiment, the photodetector 110 may include, but is not limited to, a photo diode, a photo transistor, an image sensor (a charge-coupled device (CCD), complementary metal-oxide semiconductor (COMS)) or the like.

Then the problem of determining the spectrum of reflection of radiation from the sample is solved. For this purpose the solution of equation (1) is used $$a * x = b \qquad (1),$$

where a is a calibration matrix of order ((M×N)),

M is the number of rows in the matrix equal to the number of values of the voltage applied to the liquid crystal cell, N is the number of columns, the number of points that describe the spectrum and determine the resolution with which it can be reconstructed (for example, at N=100 and in the wavelength range of 1200-1800 nm, we can reconstruct the spectrum in steps of (1800−1200)/100=6 nm). It should be noted that N is specified based on the requirements for the spectral resolution. That is, if it is necessary to restore the spectrum, for example, with a step of 6 nm in the range 1200-1800 nm, it is necessary to select N equal to 100, x is a reflection spectrum of a sample to be determined having dimensional vector (N×1), b is a signal from the dimensional photodetector (M×1).

Taking into account the dimension of the above-noted values, the expression above may be rewritten as follows:

$$a(M \times N) * x(N \times 1) = b(M \times 1).$$

The calibration matrix a is formed as follows: the radiation spectrum of the calibration source (LED) passed through the liquid crystal cell is measured by the total quantity M for each voltage value with a conventional spectrometer. One spectrum is a signal of order 1×N. In other words, a transmission spectrum of order 1×N is measured for each one of M voltage values. Thus, the set of transmission spectra of the calibration source radiation through the liquid crystal cell for all voltage values is M×N.

By illuminating a sample with a calibration source and changing the voltage in the liquid crystal cell, a set of signal values of the photodetector positioned at the output of the liquid crystal cell is obtained. A set of photodetector signal values, M×1, is obtained for the same set of voltage values M.

Having a calibration matrix a and a signal at the photodetector b, the reflection spectrum of the sample x is determined from the expression (1) above.

Figure 5:
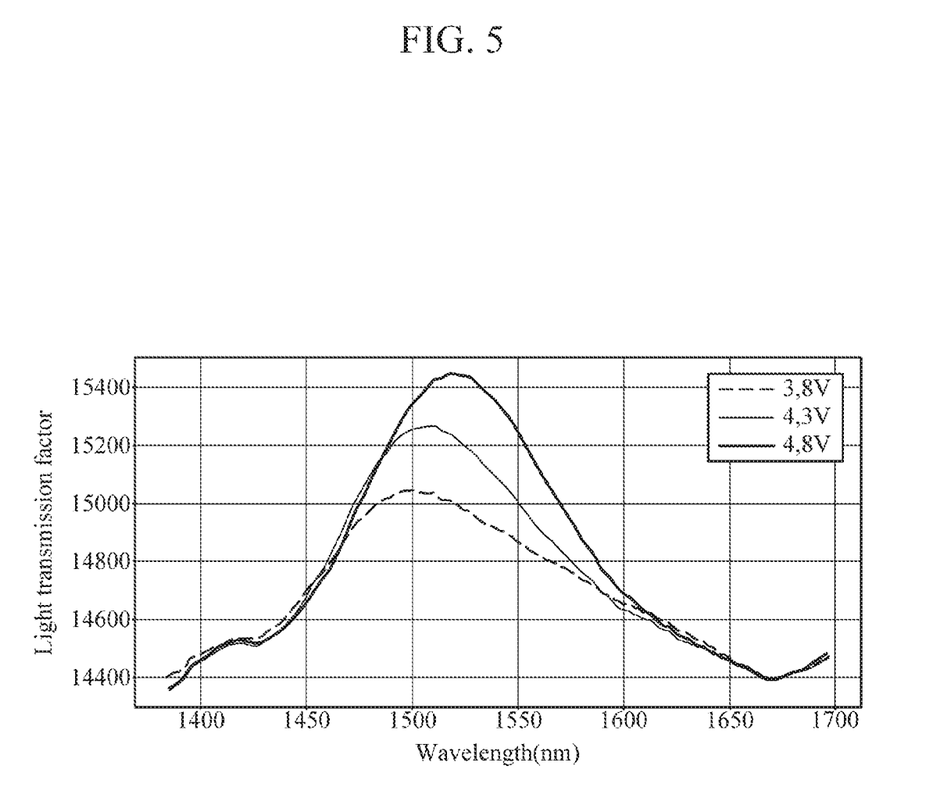
FIG. 5 shows experimental dependencies of infra-red radiation transmission through the liquid crystal cell according to applied voltage.

The calibration matrix a is measured during the assembly stage of the spectrometer and requires the use of an additional spectrometer that records various spectra of radiation generated by the LEDs at the liquid crystal cell output at different values of the applied voltage. Some typical spectra measured at the liquid crystal cell output at different voltage values are shown in FIG. 5 that demonstrate the cell operation at different applied voltage levels. FIG. 5 serves to demonstrate the operation of the filter using experimental data. The thick solid curve indicates the spectrum obtained by applying a voltage of 4.8 V, the dashed curve indicates the spectrum obtained by applying a voltage of 3.8 V, and the thin solid curve indicates the spectrum obtained by applying a voltage of 4.3 V. To reconstruct the reflection spectrum of the sample, it is necessary to obtain a signal b and to filter the radiation reflected from the sample and passing through the liquid crystal cell. The exact spectrum is determined by solving the above expression.

The current embodiments can be implemented as computer readable codes in a computer readable recording medium. Codes and code segments constituting the computer program can be easily inferred by a skilled computer programmer in the art. The computer readable recording medium includes all types of recording media in which computer readable data are stored. Examples of the computer readable recording medium include a ROM, a RAM, a CD-ROM, a magnetic tape, a floppy disk, and an optical data storage. Further, the recording medium may be implemented in the form of a carrier wave such as Internet transmission. In addition, the computer readable recording medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A tunable optical filter, comprising:
  a light source configured to emit optical radiation to a sample;
  an input optical element configured to receive optical radiation reflected from the sample;
  a liquid crystal cell comprising electrodes, the liquid crystal cell contacting the input optical element;
  an output optical element, contacting the liquid crystal cell; and
  a control unit adapted to apply a preset voltage to the liquid crystal cell via the electrodes;
  wherein the input optical element and the output optical element have a same first refractive index,
  wherein, when voltage is not applied to the liquid crystal cell, the first refractive index is greater than a second refractive index of the liquid crystal cell for a wavelength range of incident optical radiation, and
  wherein the input optical element, the liquid crystal cell and the output optical element are tilted at an angle to the incident optical radiation.

2. The tunable optical filter according to claim 1, wherein the light source is configured to emit collimated optical radiation.

3. The tunable optical filter according to claim 1, further comprising a collimating lens configured to collimate the optical radiation reflected from the sample.

4. The tunable optical filter according to claim 1, further comprising a polarizer configured to polarize the optical radiation reflected from the sample.

5. The tunable optical filter according to claim 4, wherein the polarizer is at least one from among a polarizing plate, a wire grid polarizer and a thin film polarizer.

6. The tunable optical filter according to claim 1, wherein each of the input optical element and the output optical element comprises a photopolymer or glass.

7. The tunable optical filter according to claim 1, wherein each of the input optical element and the output optical element comprises at least one from among an optical fiber, a holographic optical element and a prism.

8. The tunable optical filter according to claim 1, wherein, in response to no voltage being applied to the liquid crystal cell, all optical radiation incident upon a boundary between the input optical element and the liquid crystal cell is reflected, and
    wherein, in response to the preset voltage being applied to the liquid crystal cell, a working portion of the optical radiation incident upon the boundary between the input optical element and the liquid crystal cell is transmitted and a remaining portion of the optical radiation incident upon the boundary between the input optical element and the liquid crystal cell is reflected.

9. The tunable optical filter according to claim 8, wherein the control unit is configured to adjust the preset voltage value to adjust a wavelength range of optical radiation transmitted by the liquid crystal cell.

10. The tunable optical filter according to claim 1, wherein the input optical element is positioned between the liquid crystal cell and the sample.

11. The tunable optical filter according to claim 1, wherein the liquid crystal cell is positioned between the sample and the output optical element.

12. The tunable optical filter according to claim 1, further comprising a photodetector configured to detect optical radiation exiting the output optical element.

* * * * *